United States Patent
Ashley et al.

(10) Patent No.: US 6,587,292 B1
(45) Date of Patent: Jul. 1, 2003

(54) MAGNETO-RESISTIVE ASYMMETRY COMPENSATION LOOP

(75) Inventors: Jonathan Ashley, Los Gatos, CA (US); James Wilson Rae, Rochester, MN (US); Stephen J. Franck, Felton, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/546,796

(22) Filed: Apr. 11, 2000

Related U.S. Application Data

(60) Provisional application No. 60/129,654, filed on Apr. 16, 1999.

(51) Int. Cl.$^7$ .............................................. G11B 5/035
(52) U.S. Cl. .............................. 360/39; 360/46; 360/65
(58) Field of Search ............................. 360/65, 39, 46, 360/25, 31

(56) References Cited

U.S. PATENT DOCUMENTS

| | | | |
|---|---|---|---|
| 5,283,521 A | 2/1994 | Ottesen et al. | 324/225 |
| 5,418,660 A | 5/1995 | Sato et al. | 360/65 |
| 6,332,205 B1 * | 12/2001 | Conway | 360/45 |

FOREIGN PATENT DOCUMENTS

| | | | | |
|---|---|---|---|---|
| DE | 197 49 103 | | 11/1998 | G11B/5/09 |
| EP | 0 766 244 | | 4/1997 | G11B/20/10 |
| WO | WO 96/18189 | | 6/1996 | G11B/5/39 |
| WO | WO 96/37882 | | 11/1996 | G11B/5/035 |

* cited by examiner

*Primary Examiner*—David Hudspeth
*Assistant Examiner*—Varsha A. Kapadia
(74) *Attorney, Agent, or Firm*—Fish & Richardson P.C.

(57) ABSTRACT

A magneto-resistive asymmetry compensation system includes a linearizer (61) interposed in a data path and a control loop (63). The control loop uses signal estimates from an interpolated timing response unit (25) to derive a magneto-resistive asymmetry error. The error term is used to obtain a control scaling input to the linearizer. The linearizer functions to multiply the scaling multiple to the square of the input signal and then add it back to the input signal.

13 Claims, 3 Drawing Sheets

MAGNETO-RESISTIVE ASYMMETRY COMPENSATION LOOP

CROSS-REFERENCE TO RELATED APPLICATIONS

This application claims priority from U.S. Provisional Application Ser. No. 60/129,654, filed Apr. 16, 1999, which is hereby incorporated by reference in its entirety as if fully set forth herein.

BACKGROUND OF THE INVENTION

1. Field of the Invention

The present invention relates to disk drives and, particularly, to improved magneto-resistive asymmetry compensation for sampled amplitude read channels.

2. Description of the Related Art

Magnetic recording systems store information on a magnetic medium using regions of different magnetization. The magnetic transitions are read to and written by magnetic heads. It is desirable for the positive and negative pulses to have equal amplitudes. However, magneto-resistive heads can produce an asymmetric response signal. That is, the positive and negative peaks can have differing amplitudes. This can cause inaccuracies in readback.

As such, there is a need for magneto-resistive asymmetry compensation in magnetic recording systems employing magneto-resistive heads.

SUMMARY OF THE INVENTION

These and other drawbacks in the prior art are overcome in large part by a system and method according to the present invention. A magneto-resistive asymmetry compensation system includes a linearizer interposed in a data path and a control loop. The control loop uses signal estimates from an interpolated timing response unit to derive a magneto-resistive asymmetry error. The error term is used to obtain a control scaling input to the linearizer. The linearizer functions to multiply the scaling multiple to the square of the input signal and then to add it back to the input signal. A DC offset control loop may be also provided.

A better understanding of the invention is obtained when the following detailed description is considered in conjunction with the following drawings.

DETAILED DESCRIPTION OF THE INVENTION

FIGS. 1–5 illustrate a read/write channel with magneto-resistive asymmetry compensation according to an implementation of present invention. A magneto-resistive asymmetry compensation system includes a linearizer interposed in a data path and a control loop. The control loop uses signal estimates from an interpolated timing response unit to derive a magneto-resistive asymmetry error. The error term is used to obtain a control scaling input to the linearizer. The linearizer functions to multiply the scaling multiple to the square of the input signal and then to add it back to the input signal. A DC offset control loop is further provided.

Figure 1:
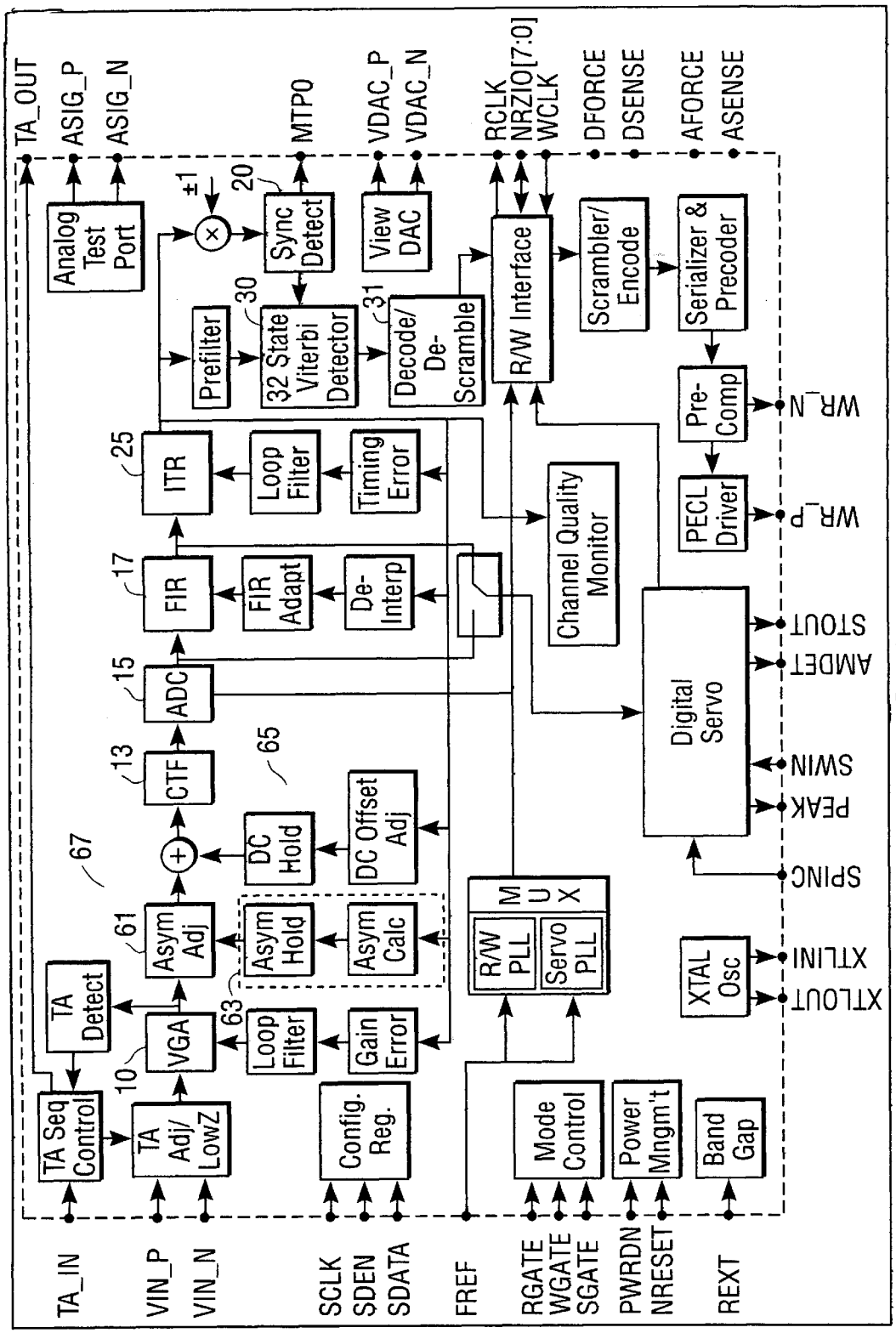
FIG. 1 is a block diagram of a read/write channel according to a specific embodiment of the invention.

FIG. 1 is a block diagram of a read/write channel according to a specific embodiment of the invention. In the read channel, a bit sequence is provided to a variable gain amplifier 10 to adjust the amplitude of the signal. DC offset control 65 and loop filter/gain error correction also may be provided. Further, an asymmetry control unit 67 including an asymmetry adjustment unit 61 and asymmetry control 63 according to an implementation of the present invention are provided to compensate for magneto-resistive asymmetry effects.

The signal is provided to a continuous time filter (CTF) 13, such as a four pole Butterworth filter, for example, to attenuate high frequency noise and minimize aliasing into baseband after sampling. The signal is then provided to an analog-to-digital converter (ADC) 15 to sample the output of CTF 13.

A finite impulse response (FIR) filter 17 provides additional equalization of the signal to the desired response. The output of the FIR 17 is provided to an interpolated timing recovery unit 25, which is used to recover the discrete time sequence. Exemplary timing recovery is described in commonly-assigned U.S. patent application Ser. No. 09/497,301, "Asynchronous Timing for Interpolated Timing Recovery," filed Feb. 2, 2000, and commonly-assigned U.S. patent application Ser. No. 09/496,617, "Synchronous Timing for Interpolated Timing Recovery," filed Feb. 2, 2000, which are hereby incorporated by reference in their entireties as if fully set forth herein.

The output of the interpolated timing recovery unit 25 is used to provide a feedback control to the DC offset control 65, the gain error, the asymmetry control 63 and the FIR 17. The output of the interpolated timing recovery 25 is further provided to a Viterbi detector 30 and a sync detector 20. Sync mark information is then provided to the Viterbi detector 30 for use in sequence detection. The Viterbi detector output is then provided to the decoder 31 which decodes the encoding provided by the encoder (not shown). Exemplary sync mark detection is described in commonly-assigned U.S. patent application Ser. No. 09/435,333, "Phase Assisted Synchronization Detector," filed Nov. 5, 1999, which is hereby incorporated by reference in its entirety as if fully set forth herein. As described therein, relatively short sync byte detection may be performed, thereby saving overhead. Further, the sync byte detector is programmably polarity sensitive such that the polarity of the data stream entering the sync detector and the Viterbi detector may be flipped. Exemplary acquisition signal estimation is described in U.S. patent application Ser. No. 09/480,314, titled "An Acquisition Signal Error Estimator," filed Jan. 10, 2000, which is hereby incorporated by reference in its entirety as if fully set forth herein. Exemplary Viterbi detection is described in commonly-assigned U.S. patent application Ser. No., 09/347,598, titled "Trellis Code for EPRML", filed Jul. 1, 1999, commonly-assigned U.S. patent application Ser. No. 09/465,521, titled "Survival Selection Rule," filed Dec. 16, 1999, and commonly-assigned U.S. patent application Ser. No. 09/503,534, titled "Supporting ME2PRML and M2EPRML with the Same Trellis Structure," filed Feb. 14, 2000, all of which are hereby incorporated by reference in their entireties as if fully set forth herein.

Figure 2:
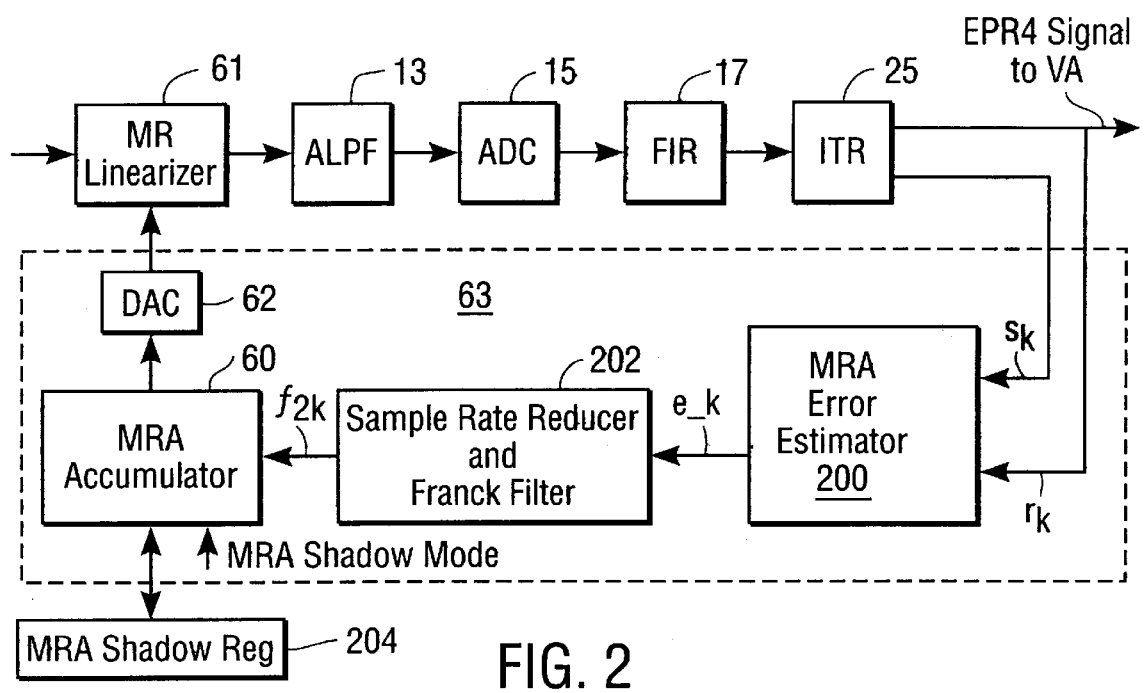
FIG. 2 is a diagram of a read/write channel including an magneto-resistive asymmetry (MRA) control loop according to an implementation of the invention.

The magneto-resistive asymmetry compensation loop 67 is illustrated more clearly with reference to FIG. 2. As shown in FIG. 2, the output of the VGA is received into the magneto-resistive (MR) linearizer unit 61, the CTF 13, ADC 15, the finite impulse response (FIR) filter 17, and the interpolated timing recovery unit 25, as discussed above. The output of the ITR 25 is then provided to an MRA error estimator 200. The MRA error estimator 200 estimates the value of the asymmetry error at the ITR output. In the implementation illustrated, the error estimate $e_k$ is provided to a sample rate reducer and Franck filter (SRR/FF) unit 202. The sample rate reducer adds together two successive asymmetry error estimates so that the output can be sub-sampled at half speed. The remaining digital part of the MRA loop downstream from the sample rate reducer can operate at half speed. The Franck filter is a finite state machine that reduces jitter in the values being added to the MRA accumulator 60, which in turn reduces the analog switching noise in he MR linearizer 61.

The MRA accumulator 60 is a simple accumulator (integrator) where the input is scaled to vary the closed loop bandwidth. An MRA shadow register 204 is used to program a gain value. Finally, as will be explained in greater detail below, the MR linearizer 61 adds a controlled multiple of squared signal output to the signal input in order to compensate for the input distortion due to the MR head.

Figure 3:
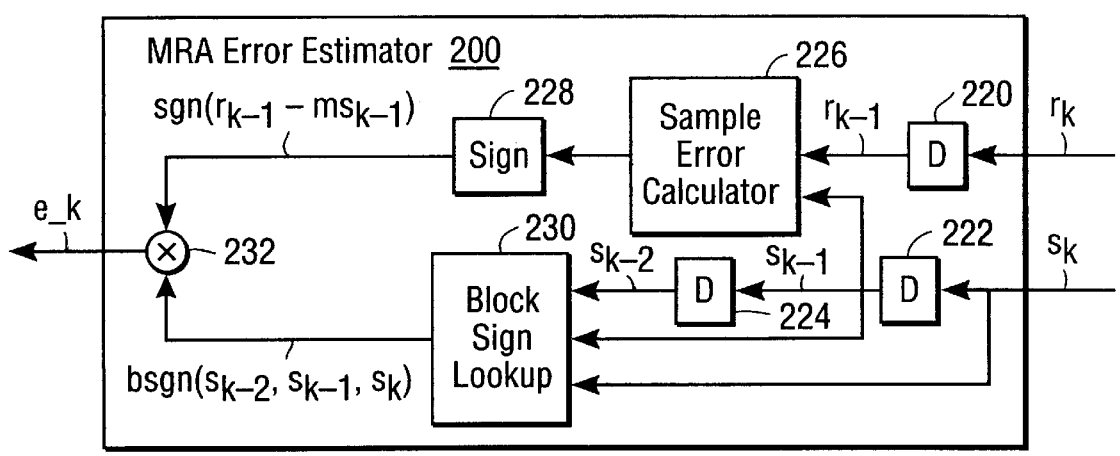
FIG. 3 is a diagram of an MRA error estimator according to an embodiment of the invention.

The MRA Aysmmetry Error Estimator 200 is illustrated in greater detail in FIG. 3. The MRA Error Estimator 200 receives two inputs $r_k$, $s_k$ from the ITR unit 25. In the implementation illustrated, the input $r_k$ is the Extended Partial Response IV (EPR4) equalized and retimed received values; the $s_k$ are the corresponding 5-level slicer values $s_k$ is in the set $\{-2, -1, 0, 1, 2\}$. It is noted that the invention is not limited to an extended partial response system. Higher of lower orders of partial response may also be implemented.

Returning to FIG. 3, the received value inputs $r_k$ are delayed (D) 220 and input to a sample error calculator unit 226. The slicer values $s_k$ are similarly delayed (D) 222 and input to the sample error calculator 226. The sample error calculator 226 performs the subtraction $r_k-ms_k$, where $ms_k$ is the slicer estimate of the ideal equalized sample value.

The slicer values are delayed further (D) 224 and then input to a block sign lookup unit 230, along with the two prior slicer values. The block sign lookup 230 performs the operation defined by the following table:

| $(S_{k-2}, S_{k-1}, S_k)$ | Bsgn |
|---|---|
| +/- (x, 2, y) | 1 |
| +/- (0, 1, 0) | 1 |
| +/- (1, 1, 0) | 1 |
| +/- (0, 1, 1) | 1 |
| +/- (1, 0, x) | -1 |
| +/- (2, 0, x) | -1 |
| +/- (x, 0, 1) | -1 |
| +/- (x, 0, 2) | -1 |
| All others | 0 |

The error term $e_k$ is then obtained by multiplying (232) the outputs of the block sign lookup 230 and the sample error calculator 226, which has been processed by the sign function 228.

The MRA error term $e_{2k-1}$ at each odd time is added to the gain error output $e_{2k}$ at the following (even) time. The result $e_{sac}(2k)=e_{2k-1}+e_{2k}$ is clocked into the Franck filter at half the clock rate.

The Franck filter may be implemented as a state machine operating on the half speed clock. The following table defines its operation:

|    | -4   | -3   | -2  | -1  | 0   | 1   | 2   | 3   |
|----|------|------|-----|-----|-----|-----|-----|-----|
| -2 | -2/-4 | -2/-3 | 0/-4 | 0/-3 | 0/-2 | 0/-1 | 0/0 | 0/1 |
| -1 | -1/-4 | -1/-3 | 0/-3 | 0/-2 | 0/-1 | 0/0 | 0/1 | 0/2 |
| 0  | 0/-4 | 0/-3 | 0/-2 | 0/-1 | 0/1 | 0/1 | 0/2 | 0/3 |
| 1  | 0/-3 | 0/-2 | 0/-1 | 0/0 | 0/1 | 0/2 | 1/2 | 1/3 |
| 2  | 0/-2 | 0/-1 | 0/0 | 0/1 | 0/2 | 0/3 | 2/2 | 3/3 |

The rows correspond to the five possible values of the input signal $e_{sac}(2k)$, and the columns correspond to the eight possible values of a state variable $\sigma_{2k}$. The entries are of the form $f_{2k}/\sigma_{2k+2}$, where $f_{2k}$ is the output and $\sigma_{2k+2}$ is the next state.

Figure 4:
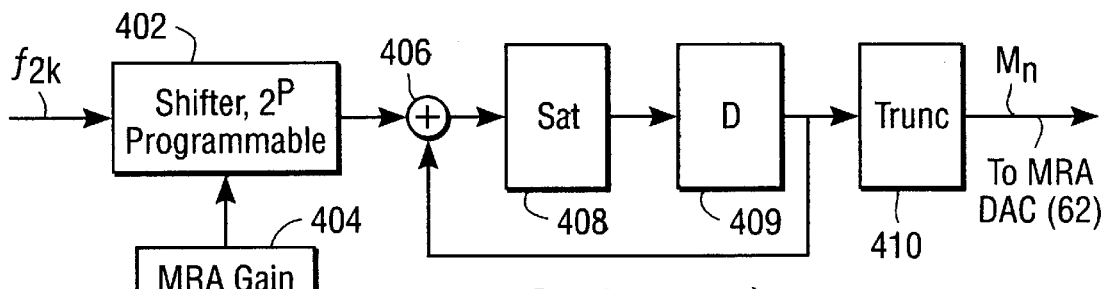
FIG. 4 is a diagram of an accumulator in an MRA asymmetry control loop according to an embodiment of the invention.

The MRA accumulator 60 is shown in FIG. 4. Essentially, the MRA accumulator is a simple scaled integrator used to average the scaling value, as described below. The output $f_{2k}$ is received into a shifter 402, which also receives an MRA gain input 404. The output of the shifter 402 is summed (406) with the delayed saturator output (408, 409), truncated (410) and then output to the MRA DAC 62. The saturator 408 performs the operation x=max (L, min(x, U)), where L is the smallest and U is the largest value that the register 409 can hold. The MRA shadow register 204 (FIG. 2) is used to program the gain value 404. More particularly, the accumulator accumulates a value $M_n$, where $M_{n+1}=M_n+(Y_{mr}\times f_{2k})$ and the loop gain $Y_{mr}=2^{-11}$. In this implementation the loop gain $Y_{mr}$ has only setting. The output $M_n$, is provided to a DAC 62; the resulting output $V_{mr}$ of the DAC 62 is provided to the MR linearizer 61 and is the control signal that adjusts the degree of compensation.

Figure 5:
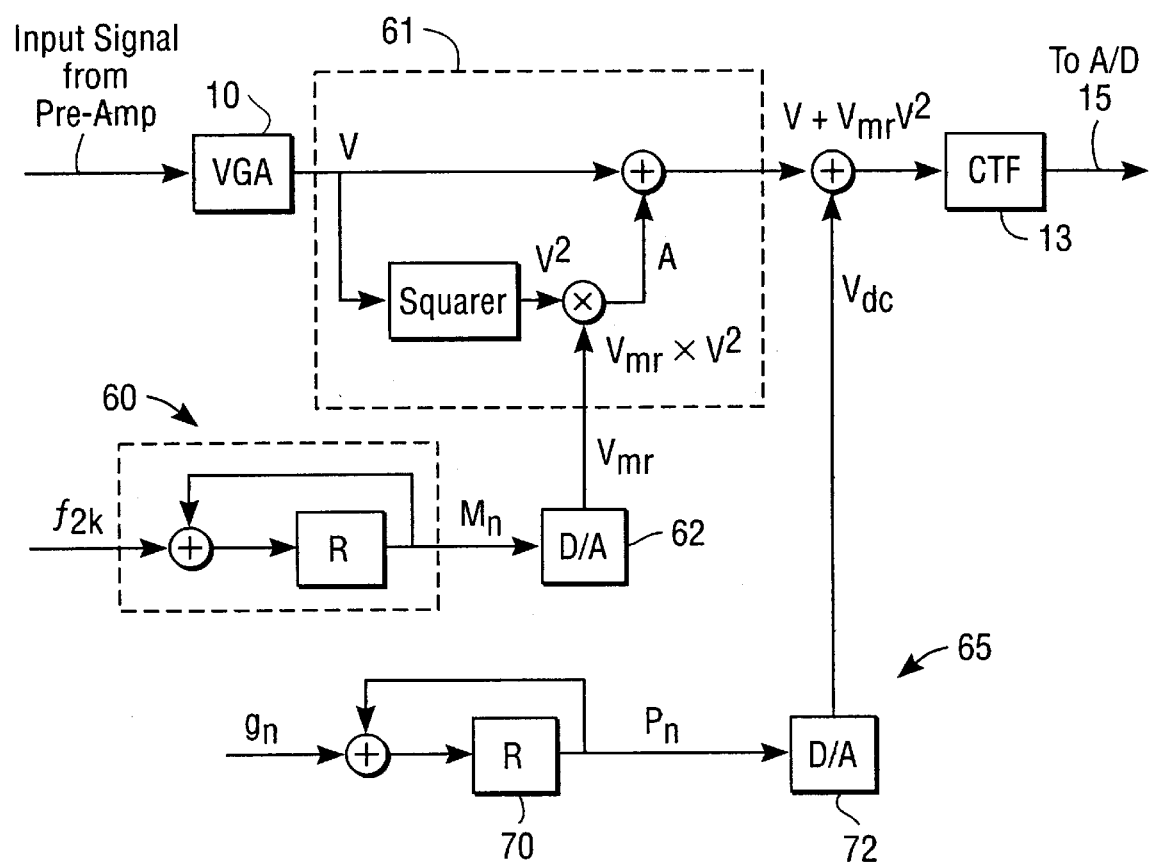
FIG. 5 is a diagram illustrating magneto-resistive asymmetry compensation and DC-restore circuits according to an embodiment of the invention.

The MR linearizer 61 is shown in greater detail with reference to FIG. 5. A shown, the output V of the variable gain amplifier (VGA) 10 is squared and then added to signal $A=V_{mr}\times V^2$. Thus, the signal $V^2$ is scaled by the control signal $V_{mr}$ and added to the output of the VGA so that the output of the MR asymmetry compensation loop becomes $V+V_{mr}\times V^2$. The feedback loop acts to adjust $V_{mr}\times V^2$ to the exact value needed to compensate for the second harmonic distortion due to the magneto-resistive head.

In addition to the MR asymmetry compensation loop, a DC restore loop 65, as shown in FIG. 5, is provided. As can be appreciated, the squared term provided by the MR asymmetry compensation adds some DC into the signal. The DC restore loop compensates for this. The DC restore loop 65 derives a voltage $V_{dc}$, which is used to null the DC value of the signal into the CTF 13 and analog-to-digital converter (ADC) 15. The DC offset is measured both during preamble and data acquisition by using the output samples of the ADC 15. At each synchronous clock cycle, the error term $g_n$ is calculated such that $g_n=r_n-s_n$, where $r_n$ is the ITR output sample and $s_n$ is the corresponding slicer estimate of the ideal output. According to one embodiment, the error term is calculated such that the loop gain $Y_{dc}=2^{-9}$ (a high gain setting that is used during WRITE to IDLE recovery), or $Y_{dc}=2^{-11}$ (a low gain setting that is used when reading data). The error term is then added to the DC error accumulator 70 (box R) that accumulates a value $P_n$, where $P_{n+1}=P_n+g_n$. The accumulator 70 drives a digital-to-analog converter (DAC) 72, whose output $V_{dc}$ in turn adds the DC voltage $V_{dc}$ to the analog signal path before the CTF 13. Thus, the control loop functions to null the DC offset as measured at the ADC output.

The invention described in the above detailed description is not intended to be limited to the specific form set forth herein, but is intended to cover such alternatives, modifications and equivalents as can reasonably be included within the spirit and scope of the appended claims.

What is claimed:

1. A magneto-resistive asymmetry correction circuit, comprising:

a magneto-resistive linearizer circuit adapted to receive an input from an amplifier, said magneto-resistive linearizer being designed to compensate for magneto-resistive asymmetry in a sampled amplitude read channel; and a control circuit for providing a control input to said magneto-resistive linearizer circuit, said control circuit adapted to receive as inputs a plurality of signal estimates unit; wherein said control circuit determines a magneto-resistive assymetry error term whose computation depends on a plurality of successive signal estimates, said plurality of successive signal estimates being derived from said plurality of signal estimates, said magneto-resistive assymetry error term being used to obtain said control input to said magneto-resistive linearizer circuit.

2. A magneto-resistive asymmetry correction circuit in accordance with claim 1, wherein said control circuit includes a rate reduction unit and state machine filter operating at a half speed clock.

3. A magneto-resistive asymmetry correction circuit in accordance with claim 1, said control circuit including an error estimator, said error estimator adapted to estimate a magneto-resistive asymmetry error.

4. A magneto-resistive asymmetry correction circuit in accordance with claim 3, said control circuit including a sample rate reducer.

5. A magneto-resistive asymmetry correction circuit in accordance with claim 3, said linearizer adapted to add a multiple of a square of an input signal to said input signal.

6. A magneto-resistive asymmetry correction circuit in accordance with claim 3, including a digital finite state machine filter for attenuating analog switching noise.

7. A magneto-resistive asymmetry correction circuit, comprising:

a magneto-resistive linearizer circuit adapted to receive an input from an amplifier; and a control circuit providing an input to said magneto-resistive linearizer circuit, said control circuit receiving as inputs a plurality of signal estimates, said control circuit including a sample rate reducer;

an error estimator, said error estimator adapted to estimate a magneto-resistive asymmetry error; and a state machine defined substantially as follows:

|    | −4    | −3    | −2   | −1   | 0    | 1    | 2    | 3    |
|----|-------|-------|------|------|------|------|------|------|
| −2 | −2/−4 | −2/−3 | 0/−4 | 0/−3 | 0/−2 | 0/−1 | 0/0  | 0/1  |
| −1 | −1/−4 | −1/−3 | 0/−3 | 0/−2 | 0/−1 | 0/0  | 0/1  | 0/2  |
| 0  | 0/−4  | 0/−3  | 0/−2 | 0/−1 | 0/1  | 0/1  | 0/2  | 0/3  |
| 1  | 0/−3  | 0/−2  | 0/−1 | 0/−0 | 0/1  | 0/2  | 1/2  | 1/3  |
| 2  | 0/−2  | 0/−1  | 0/0  | 0/1  | 0/2  | 0/3  | 2/2  | 3/3  | wherein rows correspond to five possible values of an input signal $e_{sac}(2k)$, and columns correspond to eight possible values of a state variable $\sigma_{2k}$; and entries are of the form $f_{2k}/\sigma_{2k+2}$, where $f_{2k}$ is the output and $\sigma_{2k+2}$ is the next state.

8. A sampled amplitude read channel comprising means for receiving encoded data; and a magneto-resistive asymmetry loop, said magneto-resistive asymmetry loop including:

a magneto-resistive linearizer circuit adapted to receive an input from an amplifier, said magneto-resistive linearizer being designed to compensate for magneto-resistive asymmetry in a sampled amplitude read channel; and a control circuit providing a control input to said magneto-resistive linearizer circuit, said control circuit receiving as inputs a plurality of signal estimates timing response unit, wherein said control circuit determines a magneto-resistive assymetry error term whose computation depends on a plurality of successive signal estimates, said plurality of successive signal estimates being derived from said plurality of signal estimates, said magneto-resistive assymetry error term being used to obtain said control input to said magneto-resistive linearizer circuit.

9. A sampled amplitude read channel according to claim 8, wherein said control circuit includes a rate reduction unit and state machine filter operating at a half speed clock.

10. A sampled amplitude read channel according to claim 8, said control circuit including an error estimator, said error estimator adapted to estimate a magneto-resistive asymmetry error.

11. A sampled amplitude read channel in accordance with claim 8, said linearizer adapted to add a multiple of a square of an input signal to said input signal.

12. A sampled amplitude read channel in accordance with claim 8, including a digital finite state machine filter for attenuating analog switching noise.

13. A sampled amplitude read channel in accordance with claim 8, further including a DC offset control loop adapted to compensate for a DC offset.

\* \* \* \* \*